United States Patent [19]

Harada et al.

[11] 4,332,932
[45] Jun. 1, 1982

[54] METHOD FOR PRODUCING A RUBBER MELT IN A TEMPERATURE-CONTROLLED SCREW EXTRUDER

[75] Inventors: Kunihiro Harada, Machida; Kiyoshi Kasai, Yokohama; Yoshiki Maki; Norimasa Oda, both of Hiroshima, all of Japan

[73] Assignees: Japan Synthetic Rubber Co., Ltd.; The Japan Steel Works, Ltd., both of Tokyo, Japan

[21] Appl. No.: 112,291

[22] Filed: Jan. 15, 1980

[30] Foreign Application Priority Data

Jan. 16, 1979 [JP] Japan .................. 54-3635

[51] Int. Cl.³ .................................................. C08C 4/00
[52] U.S. Cl. .................. 528/481; 260/816 R; 260/816 G; 425/208; 528/502
[58] Field of Search ............... 528/481, 502; 260/816 R, 816 G

[56] References Cited

U.S. PATENT DOCUMENTS

| | | | |
|---|---|---|---|
| 2,487,666 | 11/1949 | Navone | 260/816 |
| 2,871,205 | 1/1959 | Mankowich | 260/816 |
| 3,340,304 | 9/1967 | Hall | 528/481 |
| 3,341,621 | 9/1967 | Hagemeyer, Jr. | 528/481 |
| 3,458,494 | 7/1969 | Scoggin | 528/481 |

*Primary Examiner*—C. A. Henderson
*Attorney, Agent, or Firm*—Oblon, Fisher, Spivak, McClelland & Maier

[57] ABSTRACT

When rubber is melted and decomposed in a screw extruder, a rubber melt can be produced without using a heavy oil with minimized evolution of gas by controlling the extruder cylinder temperature in the decomposing section of the screw within the range of 400°–500° C. and cooling the melt in the discharging section of the screw to a temperature of not more than 250° C. The screw extruder suited for practising this method comprises a screw having a feeding section, a compressing section, a decomposing section and a discharging section which are arranged in that order from the inlet side, and a cylinder assembly consisting of a heating cylinder and a cooling cylinder arranged in that order from the inlet side, said feeding, compressing and decomposing sections of the screw being located corresponding to said heating cylinder, and said discharging section of the screw being located corresponding to said cooling cylinder.

11 Claims, 1 Drawing Figure

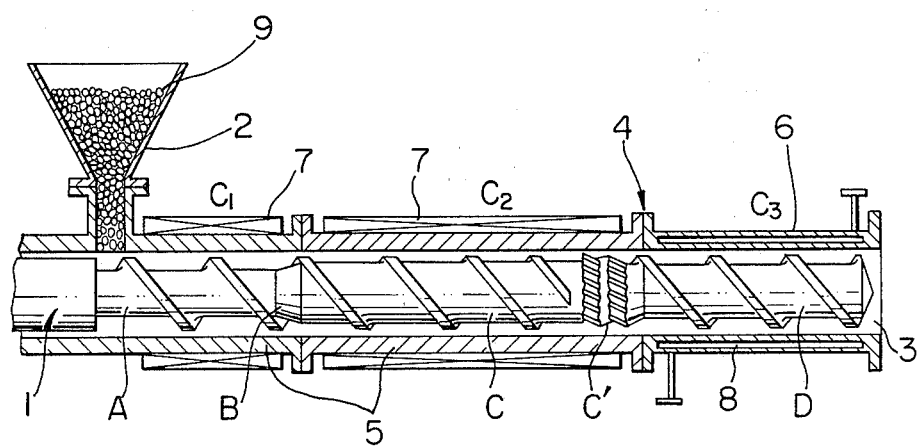

METHOD FOR PRODUCING A RUBBER MELT IN A TEMPERATURE-CONTROLLED SCREW EXTRUDER

BACKGROUND OF THE INVENTION

1. Field of the Invention

This invention relates to a method for producing a rubber melt and apparatus therefor, and more particularly, it relates to a method and apparatus for producing a rubber melt of high industrial utility by treating rubber both mechanically and thermally.

2. Description of the Prior Art

Rubber waste comprising waste tires mainly is now posing a serious social problem along with plastic waste. Although many and extensive studies are being made in search for an effective way for disposal or utilization of such rubber waste, there is yet available no effective and economical method for mass utilization of such rubber waste, except for processing the same into reclaimed rubber, and the bulk of rubber waste is either buried in the ground or incinerated. Under such circumstances, it is a desideratum to develop a method and apparatus for enabling the effective recycling of rubber waste, the main source of which is waste tires.

Recently, attention has been directed to a dry distillation method (such as proposed in Japanese Patent Publication No. 8354/77) as an effective means for the treatment of rubber waste. According to this method, vulcanized rubber is thermally decomposed at 300°–700° C. to separate it into three phases, that is, gas, oil and solid residue, the gas and oil of which are put to reuse as fuel while the solid residue is utilized as various types of useful carbon materials or as coke fuel. This method, however, is low in throughput capacity for its vast equipment and maintenance costs and the estimated value of the products is also low. Therefore, said method has an economical problem.

In order to solve these problems, there has been proposed a method which is totally different in principle from such conventional methods, that is, a method in which a screw extruder is used for producing a vulcanized rubber melt (Japanese Patent Publication No. 43873/76). The point of this new method is that vulcanized rubber is heated in a screw extruder together with at least 25 parts by weight of a heavy oil or the thus obtained vulcanized rubber melt per 100 parts by weight of said rubber at a temperature of 310°–380° C. in the presence of air to decompose the vulcanized rubber. According to this method, however, the heavy oil or vulcanized rubber melt must be added in an amount of at least 25 parts by weight per 100 parts by weight of the vulcanized rubber, and therefore, there are required means for supplying such a heavy oil or for recycling the melt, and further, the substantial throughput of vulcanized rubber is limited.

The most important factors in melting the rubber by a screw extruder are that the produced melt has a moderate viscosity and that the degree of melting is as high as substantially 100%.

When the melt viscosity is too high, a problem is caused in treatment of the melt in some uses, while a low degree of melting, which means the existence of non-melted matters, brings about an unfavorable result in use of the rubber melt. Particularly when such a melt is used as a rubber compounding agent, the existence of the non-melted matters may cause a deterioration in physical properties.

SUMMARY OF THE INVENTION

The present inventors have conducted extensive studies aiming at the efficient and economical production of a useful rubber melt by use of a screw extruder with no essential need of supplying a heavy oil or recycling the rubber melt, and have found as a consequence that an efficient melting of the rubber can be accomplished by melting and decomposing the rubber in a screw extruder at the cylinder temperature of 400°–500° C. and cooling the resulting rubber melt to a temperature of not more than 250° C. before it is discharged out of the extruder.

DESCRIPTION OF THE PREFERRED EMBODIMENT

Thus, according to this invention, there is provided a method for producing a rubber melt by melting and decomposing a rubber in a screw extruder, in that the cylinder temperature in the decomposing section of the screw is kept at 400°–500° C. and the resulting rubber melt is cooled to a temperature of not more than 250° C. in the discharging section of the screw.

There is further provided according to this invention apparatus for producing a rubber melt comprising a screw extruder consisting of a cylinder, a screw, an inlet and a discharge port, said screw having a feeding section, a compressing section, a decomposing section and a discharging section which are arranged in that order from the inlet side, said cylinder consisting of a heating cylinder and a cooling cylinder, said heating cylinder being located in correspondence with the feeding, compressing and decomposing sections of said screw while said cooling cylinder being located in correspondence with the discharging section of said screw.

When the method of this invention is carried out using the apparatus of this invention, the supplied rubber contacts the high-temperature inner wall of the cylinder at the decomposing section of the screw, whereby said rubber is partially reduced into an oily state to promote melting, while the produced gas is cooled and condensed at the discharging section and extruded out together with the melt. Thus, the method of this invention is capable of efficiently melting the rubber with no need of using a heavy oil, and also the emission of gas from the extruder is minimized, whereby a safe and stable operation is made possible.

When the term "rubber" is used in this invention, it refers to all sorts of general-purpose rubber and special rubber which may be either vulcanized or unvulcanized. More specifically, they include automobile tires, commercial rubber products and their waste, scrap rubber (either vulcanized or raw) produced in rubber plants, etc.

The method and apparatus of this invention are described in detail with reference to the accompanying drawing which is a front sectional view schematically illustrating an example of the apparatus used for practising the rubber melting method of this invention.

In the drawing, reference numeral 1 indicates the screw of a screw extruder, said screw 1 having a feeding section A, a compressing section B, a decomposing section C and a discharging section D arranged in that order from the inlet 2 side toward the extruder outlet 3. The cylinder assembly 4 also built in said screw extruder consists of a heating cylinder 5 located in correspondence with the feeding, compressing and decomposing sections A, B and C of said screw and a cooling cylinder 6 located in correspondence with the discharging section D. The heating cylinder 5 is divided into two zones $C_1$ and $C_2$. The zone $C_2$ which corresponds to the decomposing section C of the screw 1 needs to be heated to 400°–500° C. If the temperature of the zone $C_2$ is below 400° C., there takes place substantially no partial conversion into oil and gas of the rubber at the decomposing section C, so that sufficient melting becomes impossible with an increase of the throughput, resulting in a low degree of melting of the obtained melt. On the other hand, if the zone $C_2$ is heated to a temperature of not less than 500° C., carbides with high hardness are formed and deposit on the internal wall of the cylinder or on the screw surface to cause an obstruction, whereby the operation of the extruder is made impossible. The zone $C_1$ corresponding to the feeding section A and the compressing section B of the screw 1 is preferably heated to 200°–350° C. Heating of the zone $C_1$ to more than 300° C. is desirable in regard to the degree of melting, but it worsens biting of rubber to result in a reduction in throughput. The heating cylinder 5 may be heated by an electric means or by use of a heating medium 7.

Temperature control of the rubber melt at the extruder outlet 3 in the cooling cylinder 6 is very important. If the temperature of the melt at this point is more than 250° C., the low-boiling-point components might eject out together with the non-melted portion of rubber from the extruder outlet, resulting in an excessive rise of viscosity of the rubber melt and a drop of the degree of melting. Therefore, it is essential that the rubber melt at the extruder outlet 3 be controlled to a temperature at which the low-boiling-point matter produced in the decomposing section C condenses. When the low-boiling matter condenses, the viscosity of the rubber melt drops accordingly, and the ejection of the non-melted material is prevented simultaneously, whereby the degree of melting is increased. As aforementioned, an excessively high viscosity of the rubber melt is undesirable in some uses, and from the viewpoint of effective utilization of the melt, it is desirable in most cases that the melt viscosity is not more than 2,000,000 centipoises. In order to raise the degree of melting to about 100% and to keep the melt viscosity below said level, it needs to control the rubber melt temperature at the extruder outlet to not more than 250° C. The cooling cylinder 6 may be cooled by supplying water (or other coolant) to the jacket 8 provided around the cylinder. Cooling of the discharging section D of the screw 1 may be effected jointly with cooling of the cooling cylinder 6, or only the discharging section D may be cooled, without cooling the cylinder 6. In this case, care should be taken so as not to cool other parts of the screw. This can be well accomplished by providing a support means at the screw end and introducing cooling water into the discharging section D of the screw 1 through said support means. In view of productivity, it is preferred that the temperature of the rubber melt at the discharging section is 50° to 250° C.

In practising the present invention, rubber 9 is first supplied from the inlet 2 onto the feeding section A of the screw 1 and thence transferred to the compressing section B. The compressing section B has to be sealed with the transferred rubber pieces so as not to allow backflow of the low-boiling matter from the decomposing section C. In the ordinary screw extruders, the minor diameter of the compressing section is increased to the decomposing section. This can provide the desired sealing. In this case, however, it is recommended to employ a free charge system (in which the rubber is supplied into the inlet as a rate higher than the feeding capacity of the screw) in performing the feed of the rubber 9 from the inlet 2. Use of a controlled charge system (in which the rubber is supplied at a constant rate within the range below the feeding capacity of the screw) may be unable to provide a sufficient sealing to cause backflow. The rubber material transferred from the compressing section B to the decomposing section C is heated to 400°–500° C. to effect partial thermal decomposition and dry distilaltion to form the low-boiling matter. For accomplishing the perfect melting of rubber, it needs to provide the decomposing section C with a sufficient length, and it is also desirable to provide a shearing means C' such as a Dulmage head or a ring on the discharge side of the decomposing section C to give a strong shearing force to the rubber melt. The rubber melt is then transferred to the discharging section D together with the low-boiling matter and cooled sufficiently in this section. Consequently, the low-boiling matter condenses therein and is perfectly mixed up with the rubber melt, and the melt mixture is extruded out of the extruder at a temperature of not more than 250° C. The discharging section D needs to have a sufficient length to allow the melt to cool down to not more than 250° C. and to allow the low-boiling matter to be perfectly mixed with the rubber melt.

Therefore, it is preferred that the length of each section of the screw is as follows: Letting the inner diameter of the cylinder be d, the length of the feeding section A is $7d$ to $11d$, the length of the compressing section B is $1d$ to $5d$, the length of the decomposing section C is $10d$ to $18d$ and the length of the discharging section D is $8d$ to $14d$. If the length of the feeding section A is less than $7d$, the feeding capacity is decreased, resulting in a reduction of the extruder's capacity of treating the rubber to bring about a reduction of the discharging capacity. If the length of the compressing section B is more than $5d$, the melting of the rubber is caused too early, whereby the rubber melt is wound around the screw. Thus, it is impossible to enhance the melt-discharging capacity of the screw even by increasing the number of revolutions of the screw. If the length of the decomposing section C is less than $10d$, it is impossible to melt sufficiently the rubber. If the length of the discharging section D is less than $8d$, the mixing of the condensed product of the low-boiling matter generated in the decomposing section C with the rubber melt becomes insufficient. In particular, in the decomposing section C, it is preferable to provide a shearing section C' having a length of $2d$ to $6d$. The total screw length is preferably $28d$ to $45d$ in view of the rubber melting efficiency and the problem in manufacturing the screw.

As the screw, there may be used either a single-screw or a twin-screw. The twin-screw is preferred as the staggered flights of the respective screws can scrape down the solid residues which may otherwise deposit on the screw surface to cause an obstruction.

The size of the rubber to be fed to the inlet is not particularly limited as far as the rubber can be fed at the feeding section (A) of the screw. However, the rubber is usually crushed to a size of 2–50 mm in diameter and then fed to the inlet, though the size of the rubber may generally be varied depending on the size of the extruder and the type of screw.

For obtaining a rubber melt with a still lower viscosity, a heavy oil or the resulting rubber melt may be charged into the screw extruder together with the rubber to be treated as proposed in, for instance, Japanese Patent Publication No. 43873/76.

The rubber melt obtained according to this invention finds a variety of industrial uses. For instance, it may be used as a rubber compounding agent, a binder, a coloring agent for rubber and plastic products, an asphalt modifier, a coating material, etc.

Listed below are the characteristic features and advantages of this invention:

(1) Rubber can be melted without mixing a heavy oil or the like.

(2) A rubber melt can be produced continuously and stably in a large amount by using a screw extruder.

(3) The degree of melting of rubber can be raised to nearly 100%.

(4) The melt viscosity at 100° C. can be kept not more than 2,000,000 centipoises.

(5) The equipment and maintenance costs for the treating system are low.

This invention is described below in further detail referring to Examples, which are merely by way of illustration and not by way of limitation.

EXAMPLES 1-3 AND COMPARATIVE EXAMPLES 1-6

Used automobile tires (carbon black content: 33%) were divided into small pieces with a size of 3-5 mm in diameter by a crusher and charged into the extruder shown in the accompanying drawing. The inner diameter of the extruder cylinder was 90 mm. When the inner diameter of the cylinder is referred to as d, the total screw length is 40d, and the length of the feeding section A is 9d, the length of the compressing section B is 3d, the length of the decomposing section C is 16d, and the length of the discharging section D is 12d. Of the length of 16d of the decomposing section C, 4d is allotted for a Dulmage head.

The melting conditions and the properties of the obtained melts in the Examples of this invention and in the Comparative Examples (conventional methods) were as shown in the following table.

As for the operational conditions, voluminous and intermittent gas ejection occurred to produce a dangerous situation, and accordingly the melt was discharged by snatches in Comparative Examples 1 to 6. On the other hand, in Examples 1 to 3 of this invention, gas evolution was slight and the melt was discharged out continuously, and generally a stabilized operation was possible.

What is claimed is:

1. A method for producing a rubber melt, comprising: feeding solid rubber into a screw extruder, decomposing said solid rubber in a decomposing section of said screw extruder at a temperature of 400°-500° C. to produce a rubber melt, and cooling said rubber melt to a temperature of not more than 250° C. in a discharging section of said screw extruder.

2. A method according to claim 1, wherein the rubber used is automobile tires, commercial rubber products or their waste, or vulcanized or raw scrap rubber produced in rubber plants.

3. A method according to claim 1, wherein the screw extruder is of either single screw type or twin-screw type.

4. A method according to claim 1, wherein the screw extruder is of a twin-screw type.

5. A method according to claim 1, wherein the temperature of the cylinder of said screw extruder corresponding to a feeding section and a compressing section before the decomposing section of said screw extruder is kept at 200°-350° C.

6. A method according to claim 5, wherein the compressing section is perfectly sealed with the rubber transferred thereto.

7. A method according to claim 1, wherein the small pieces of rubber are melted together with a heavy oil or the rubber melt in the extruder.

8. A method according to claim 1 or 3, wherein said rubber melt has a viscosity of not more than 12,000,000 cps. at 100° C.

9. A method according to claim 1 or 3, wherein said rubber melt has a viscosity of not more than 2,000,000 cps. at 100° C.

10. A method according to claim 8, wherein said rubber is a vulcanized rubber.

11. A method according to claim 9, herein said rubber is a vulcanized rubber.

TABLE

| | | Cylinder temp. (°C.) | | | Screw speed (rpm) | Capacity (kg/H) | Discharging temp. (°C.) | Degree of melting (%) | C content (%) | Viscosity (c.p.) at 100° C. |
|---|---|---|---|---|---|---|---|---|---|---|
| | | $C_1$ | $C_2$ | $C_3$ | | | | | | |
| Examples | 1 | 300 | 450 | Water cooling | 80 | 85 | 196 | 100 | 33.2 | 1,380,000 |
| | 2 | 300 | 450 | Water cooling | 120 | 115 | 201 | 100 | 33.0 | 1,770,000 |
| | 3 | 300 | 410 | Water cooling | 80 | 105 | 132 | 91.2 | 33.2 | 1,530,000 |
| Comparative Examples | 1 | 300 | 450 | 450 | 80 | 85 | 382 | 77.4 | 38.5 | Unmeasurable |
| | 2 | 300 | 450 | 450 | 80 | 82 | 407 | 98.5 | 43.1 | Unmeasurable |
| | 3 | 300 | 350 | 300 | 80 | 86 | 335 | 27.7 | 33.5 | Unmeasurable |
| | 4 | 300 | 400 | 300 | 80 | 66 | 343 | 27.9 | 33.8 | Unmeasurable |
| | 5 | 300 | 400 | Note (4) | 80 | 78 | 262 | 89.5 | 34.1 | Unmeasurable |
| | 6 | 300 | 450 | Note (4) | 80 | 50 | 312 | 90.5 | 35.7 | Unmeasurable |

Notes:
(1) Free charge system was used in Examples 1 to 3 and Comparative Example 1 and 3 to 6, and controlled charge system by a feeder was used in Comparative Example 2.
(2) The degree of melting was determined in the following way: the melt was dissolved in toluene and filtered by a 200-mesh wire gauze, and the ratio of the melt which passed through the wire gauze to the total specimen was measured. The carbon black content was measured according to JIS-K 6350.
(3) The melt viscosity in the Comparative Examples was too high (above 12,000,000 c.p.) to measure.
(4) No cooling water was passed through the jacket 8 of the cooling cylinder 6 in the extruder used in the Examples.